(12) United States Patent
Nakahara

(10) Patent No.: US 10,378,448 B2
(45) Date of Patent: Aug. 13, 2019

(54) METHOD FOR PURGING FUEL CHANNEL, PURGING DEVICE FOR EXECUTING SAID METHOD, AND GAS TURBINE INSTALLATION PROVIDED WITH SAID DEVICE

(71) Applicant: MITSUBISHI HITACHI POWER SYSTEMS, LTD., Kanagawa (JP)

(72) Inventor: Hisashi Nakahara, Yokohama (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 317 days.

(21) Appl. No.: 15/304,945

(22) PCT Filed: May 28, 2015

(86) PCT No.: PCT/JP2015/065463
§ 371 (c)(1),
(2) Date: Oct. 18, 2016

(87) PCT Pub. No.: WO2015/186611
PCT Pub. Date: Dec. 10, 2015

(65) Prior Publication Data
US 2017/0138268 A1 May 18, 2017

(30) Foreign Application Priority Data
Jun. 3, 2014 (JP) ................. 2014-114737

(51) Int. Cl.
*F02C 1/00* (2006.01)
*F02C 7/232* (2006.01)
(Continued)

(52) U.S. Cl.
CPC ............ *F02C 7/232* (2013.01); *F02C 7/22* (2013.01); *F02C 9/40* (2013.01); *F23D 17/00* (2013.01);
(Continued)

(58) Field of Classification Search
CPC .. F02C 7/232; F02C 7/22; F02C 7/222; F02C 9/40; F23R 3/28; F23R 3/36;
(Continued)

(56) References Cited

U.S. PATENT DOCUMENTS

| 2008/0098994 A1* | 5/2008 | Innes | F02C 7/22 123/525 |
| 2012/0247116 A1* | 10/2012 | Meeuwissen | F02C 3/22 60/772 |
| 2013/0291547 A1* | 11/2013 | Ochiai | F02C 7/00 60/772 |

FOREIGN PATENT DOCUMENTS

| JP | 2001-059427 | 3/2001 |
| JP | 2012-017957 | 1/2012 |
| JP | 2013-231415 | 11/2013 |

OTHER PUBLICATIONS

International Search Report dated Sep. 1, 2015 in International Application No. PCT/JP2015/065463 (with English translation).
(Continued)

*Primary Examiner* — Craig Kim
*Assistant Examiner* — Edwin Kang
(74) *Attorney, Agent, or Firm* — Wenderoth, Lind & Ponack, L.L.P.

(57) ABSTRACT

A water supplying step of supplying water to a liquid-fuel channel of a nozzle is executed during a liquid fuel supply state in which only liquid fuel is supplied to the nozzle; a post-switch water purging step of supplying water to the liquid-fuel channel of the nozzle is executed during a gas fuel supply state in which only gas fuel is supplied to the nozzle; and a mid-switch water purging step of supplying water to the liquid-fuel channel of the nozzle is executed during a fuel switching state which is a state of transition from the liquid fuel supply state to the liquid fuel supply state. A second flow rate of water supplied in the mid-switch
(Continued)

water purging step is lower than a first flow rate of water supplied in the water supplying step. In the post-switch water purging step, water is temporarily supplied at a third flow rate which is higher than the second flow rate.

20 Claims, 4 Drawing Sheets

(51) Int. Cl.
*F02C 7/22* (2006.01)
*F02C 9/40* (2006.01)
*F23K 5/18* (2006.01)
*F23R 3/28* (2006.01)
*F23R 3/36* (2006.01)
*F23D 17/00* (2006.01)

(52) U.S. Cl.
CPC .................. *F23K 5/18* (2013.01); *F23R 3/28* (2013.01); *F23R 3/283* (2013.01); *F23R 3/36* (2013.01); *F05D 2260/602* (2013.01); *F23R 2900/00004* (2013.01)

(58) Field of Classification Search
CPC ............. F23R 2900/00004; F23K 5/18; F23K 2301/203; F05D 2260/602; F05D 2260/95; F23D 17/002
See application file for complete search history.

(56) References Cited

OTHER PUBLICATIONS

Written Opinion in the International Searching Authority dated Sep. 1, 2015 in International Application No. PCT/JP2015/065463.

\* cited by examiner

METHOD FOR PURGING FUEL CHANNEL, PURGING DEVICE FOR EXECUTING SAID METHOD, AND GAS TURBINE INSTALLATION PROVIDED WITH SAID DEVICE

TECHNICAL FIELD

The present invention relates to a method for purging a fuel channel in a combustor having a nozzle that selectively sprays liquid fuel and gas fuel, a purging device for executing this method, and a gas turbine installation provided with this device. This application claims priority based on Japanese Patent Application No. 2014-114737 filed in Japan on Jun. 3, 2014, of which the contents are incorporated herein by reference.

BACKGROUND ART

A gas turbine is provided with a compressor that compresses air, a combustor that combusts fuel in the air compressed by the compressor and generates combustion gas, and a turbine that is driven by the combustion gas from the combustor.

Examples of the combustor include a combustor provided with a dual-fuel nozzle that selectively sprays oil fuel, such as light oil, and gas fuel, such as natural gas. In this type of combustor provided with the dual-fuel nozzle, when the oil fuel remains in an oil fuel channel of the nozzle after switching the fuel to be used from the oil fuel to the gas fuel, coking of the oil fuel may occur under a high-temperature environment. When the coking of the oil fuel occurs in the oil fuel channel, the oil fuel channel becomes narrower, making it difficult to cause the oil fuel to flow through the oil fuel channel at an intended flow rate.

Thus, in a technology disclosed in Patent Document 1 described below, after the switching from the oil fuel to the gas fuel is completed, water is intermittently supplied to the oil fuel channel a plurality of times. After that, air is supplied to the oil fuel channel to remove the oil fuel remaining in the oil fuel channel, thereby inhibiting the coking of the oil fuel from occurring in the oil fuel channel.

CITATION LIST

Patent Document

Patent Document 1: Japanese Unexamined Patent Application Publication No. 2011-231415A

SUMMARY OF THE INVENTION

Technical Problem

In the technology disclosed in the above-described Patent Document 1, water is supplied to the oil fuel channel after the switching from the oil fuel to the gas fuel is completed. Thus, in the technology disclosed in the above-described Patent Document 1, the flow rate of the oil fuel flowing through the oil fuel channel drops in the course of switching the oil fuel to the gas fuel. Here, when the flow velocity of the oil fuel flowing through the oil fuel channel drops, there is a risk that the coking of the oil fuel may occur, which has been a problem.

In light of the foregoing, an object of the present invention is to provide a technology capable of inhibiting coking of liquid fuel.

Solution to Problem

As an aspect according to the present invention for solving the above-described problem, a method for purging a fuel channel in a combustor is provided. The combustor has a nozzle that selectively sprays liquid fuel and gas fuel. The nozzle has formed therein a liquid-fuel channel, through which the liquid fuel flows and which is open at a tip portion of the nozzle, and a gas-fuel channel, through which the gas fuel flows and which is open at the tip portion of the nozzle. The method for purging the fuel channel includes: a water supplying step of supplying water to the liquid-fuel channel in a liquid fuel supply state in which, of the liquid fuel and the gas fuel, only the liquid fuel is supplied to the nozzle; a mid-switch water purging step of supplying water to the liquid-fuel channel at the time of a fuel switching state, during which, from the liquid fuel supply state, the liquid fuel being supplied to the liquid-fuel channel of the nozzle decreases while the gas fuel starts to be supplied to the gas-fuel channel of the nozzle, and the gas fuel supplied to the gas-fuel channel increases; and a post-switch water purging step of supplying water to the liquid-fuel channel after the fuel switching state has ended as a result of the liquid fuel no longer being supplied to the liquid-fuel channel, and only the gas fuel, of the liquid fuel and the gas fuel, starts to be supplied to the nozzle. In the mid-switch water purging step, water of a second flow rate is supplied to the liquid-fuel channel, the second flow rate being lower than a first flow rate that is a flow rate of the water supplied to the liquid-fuel channel in the water supplying step. In the post-switch water purging step, water of a third flow rate is at least temporarily supplied to the liquid-fuel channel, the third flow rate being higher than the second flow rate.

In this purging method, the water is supplied to the liquid-fuel channel of the nozzle even in the fuel switching state. Thus, coking of the liquid fuel in the liquid-fuel channel can be suppressed during the fuel switching state. Further, in the fuel switching state, the combustion of the liquid fuel and the gas fuel is likely to become unstable. Thus, in this purging method, by supplying water of a low flow rate, namely, water of the second flow rate to the liquid-fuel channel of the nozzle, combustion stability is secured in the fuel switching state, and also, the coking is suppressed in the fuel switching state. Further, in this purging method, in the post-switch water purging step, water of the third flow rate, which is higher than the second flow rate, is at least temporarily supplied to the liquid-fuel channel. Thus, cleaning effects in the post-switch water purging step can be improved.

Here, in the method for purging the fuel channel, the third flow rate may be lower than the first flow rate.

Further, in any one of the above-described methods for purging the fuel channel, the post-switch water purging step may include a water replacement step of supplying water of the second flow rate to the liquid-fuel channel continuously from the mid-switch water purging step, and a cleaning step of supplying water of the third flow rate to the liquid-fuel channel after the water replacement step.

In this purging method, at the start of the post-switch water purging step, the water replacement step is performed in which water of a low flow rate, namely, water of the second flow rate is supplied to the liquid-fuel channel. Thus, the liquid fuel accumulated in the liquid-fuel channel can be inhibited from spouting out into a tube of the combustor, such as a combustion liner, in a large quantity, and also, the combustion stability can be secured. Further, after the water replacement step, the cleaning step is performed in which water of the third flow rate, which is higher than the second flow rate, is supplied to the liquid-fuel channel. Thus, removal of the liquid fuel remaining in the liquid-fuel channel can be promoted.

Further, in any one of the above-described methods for purging the fuel channel, the post-switch water purging step may include an intermittent purging step of intermittently supplying water to the liquid-fuel channel.

In the method for purging the fuel channel that performs the cleaning step, the post-switch water purging step may include an intermittent purging step of intermittently supplying water to the liquid-fuel channel after the cleaning step.

In any one of the methods for purging the fuel channel that perform the intermittent purging step, water of the third flow rate may be supplied to the liquid-fuel channel in the intermittent purging step.

In the purging method that performs the intermittent water purging step, liquid remaining in a corner and the like of the liquid-fuel channel can be removed.

In any one of the above-described methods for purging the fuel channel, in the water supplying step, a flow rate of water supplied to the liquid-fuel channel may be caused to gradually become lower before the fuel switching state is reached, such that the flow rate of water supplied to the liquid-fuel channel becomes the second flow rate at a timing at which the fuel switching state is reached.

In any one of the above-described methods for purging the fuel channel, an air purging step may be performed in which air is supplied to the liquid-fuel channel after the post-switch water purging step is completed.

In this purging method, since the air purging step is performed after the post-switch water purging step, water remaining in the liquid-fuel channel is inhibited from dropping at a high temperature into the tube of the combustor, such as the combustion liner, in the form of water droplets.

In the method for purging the fuel channel that performs the air purging step, the air purging step may include a low-pressure purging step of supplying air of a first pressure to the liquid-fuel channel, and a high-pressure purging step of supplying air of a second pressure to the liquid-fuel channel after the low-pressure purging step, the second pressure being higher than the first pressure.

In this purging method, at the start of the air purging step, the low-pressure purging step is performed in which the low-pressure air, namely, the air of the first pressure, is supplied to the liquid-fuel channel. Thus, water accumulated in the liquid-fuel channel can be inhibited from spouting out into a tube of the combustor, such as the combustion liner, in a large quantity, and also, the, combustion stability can be secured. Further, after the low-pressure purging step, the high-pressure purging step is performed in which the air of the second pressure, which is higher than the first pressure, is supplied to the liquid-fuel channel. Thus, water remaining in the liquid-fuel channel after the low-pressure purging step can be effectively sprayed into the tube of the combustor.

In any one of the above-described methods for purging the fuel channel, the combustor may include a second nozzle as well as the nozzle that functions as a first nozzle. The second nozzle may have formed therein a liquid-fuel channel, through which the liquid fuel flows and which is open at a tip portion of the nozzle, and a gas-fuel channel, through which the gas fuel flows and which is open at the tip portion of the nozzle. In the method, an air purging step of supplying air to the liquid-fuel channel of the second nozzle may be performed at a timing at which, from a liquid fuel supply state in which, of the liquid fuel and the gas fuel, only the liquid fuel is supplied to the second nozzle, the liquid fuel is no longer supplied to the second nozzle and only the gas fuel is being supplied to the second nozzle, and the post-switch water purging step for the first nozzle is being performed.

In this purging method, during the post-switch water purging step, before the post-switch water purging step for the first nozzle is completed, the air purging step is performed on the second nozzle. Thus, the coking of the liquid fuel in the liquid-fuel channel of the second nozzle can be suppressed.

In the purging method for the fuel channel that performs the air purging step for the second nozzle, the air purging step for the second nozzle may be performed after a predetermined period of time elapses from a timing at which the post-switch water purging step for the first nozzle is started.

In any one of the methods for purging the fuel channel that perform the cleaning step, the combustor may include a second nozzle as well as the nozzle that functions as a first nozzle. The second nozzle has formed therein a liquid-fuel channel, through which the liquid fuel flows and which is open at a tip portion of the nozzle, and a gas-fuel channel, through which the gas fuel flows and which is open at the tip portion of the nozzle. In the method, an air purging step of supplying air to the liquid-fuel channel of the second nozzle may be performed at a timing at which, from a liquid fuel supply state in which, of the liquid fuel and the gas fuel, only the liquid fuel is supplied to the second nozzle, the liquid fuel is no longer supplied to the second nozzle and only the gas fuel is being supplied to the second nozzle, and the post-switch water purging step for the first nozzle is being performed. Further, in the method, the air purging step for the second nozzle may be started at the same timing as a timing at which the cleaning step for the first nozzle is started.

While the water replacement step is performed on the first nozzle, the flow rate of the liquid fuel sprayed into a tube of the combustor, such as the combustion liner, from the first nozzle is relatively high. If the liquid fuel is also sprayed from the second nozzle during this water replacement step, the flow rate of the liquid fuel sprayed into the tube of the combustor becomes extremely high, and this causes an increase in the combustion amount and a deterioration of the combustion stability. Thus, in this purging method, at the same timing as a timing at which the water replacement step for the first nozzle is completed, in other words, at the same timing as a timing at which the cleaning step for the first nozzle is started, the air purging step for the second nozzle is started.

Further, in any one of the above-described methods for purging the fuel channel that perform the air purging step for the second nozzle, the air purging step for the second nozzle may include a low-pressure purging step of supplying air of a third pressure to the liquid-fuel channel of the second nozzle, and a high-pressure purging step of supplying air of a fourth pressure to the liquid-fuel channel of the second nozzle after the low-pressure purging step for the second nozzle, the fourth pressure being higher than the third pressure.

In this purging method, at the start of the air purging step for the second nozzle, the low-pressure purging step is performed in which the low-pressure air, namely, the air of the third pressure, is supplied to the liquid-fuel channel. Thus, the liquid fuel accumulated in the liquid-fuel channel can be inhibited from spouting out into the tube of the combustor, such as the combustion liner, in a large quantity, and also, the combustion stability can be secured. Further, after the low-pressure purging step, the high-pressure purging step is performed in which the air of the fourth pressure, which is higher than the third pressure, is supplied to the liquid-fuel channel. Thus, the liquid fuel remaining in the liquid-fuel channel after the low-pressure purging step can be effectively removed.

Further, in any one of the above-described methods for purging the fuel channel that perform the air purging step for the second nozzle, the second nozzle may be a nozzle that burns fuel sprayed from the second nozzle by diffusion combustion. In the method, after a first air purging step, which is the air purging step for the second nozzle, a second air purging step may be performed, in which air having a pressure lower than the pressure of the air supplied to the liquid-fuel channel of the second nozzle in the first air purging step is supplied to the liquid-fuel channel of the second nozzle.

In this purging method, a flame is inhibited from flowing backward into the liquid-fuel channel of the second nozzle.

As an aspect according to the present invention for solving the above-described problem, a purging device for a fuel channel in a combustor is provided. The combustor has a nozzle that selectively sprays liquid fuel and gas fuel. The nozzle has formed therein a liquid-fuel channel, through which the liquid fuel flows and which is open at a tip portion of the nozzle, and a gas-fuel channel, through which the gas fuel flows and which is open at the tip portion of the nozzle. The purging device includes: a water line that supplies water to the liquid-fuel channel; a water adjustment valve that adjusts a flow rate of the water flowing through the water line; and a control device that controls an opening amount of the water adjustment valve. The control device includes a fuel supply state recognition unit that recognizes a state of fuel supply to the nozzle and a water purging control unit that controls the opening amount of the water adjustment valve in accordance with the fuel supply state recognized by the fuel supply state recognition unit. The fuel supply state recognition unit recognizes a liquid fuel supply state in which, of the liquid fuel and the gas fuel, only the liquid fuel is supplied to the nozzle, a gas fuel supply state in which, of the liquid fuel and the gas fuel, only the gas fuel is supplied to the nozzle, and a fuel switching state that is a state of transition from the liquid fuel supply state to the gas fuel supply state. The water purging control unit instructs a pre-switch opening amount to the water adjustment valve, which causes water of a first flow rate to be supplied to the liquid-fuel channel, when the fuel supply state recognition unit recognizes that the liquid fuel supply state exists, instructs a mid-switch opening amount to the water adjustment valve, which causes water of a second flow rate to be supplied to the liquid-fuel channel, when the fuel supply state recognition unit recognizes that the fuel switching state exists, and instructs a post-switch opening amount to the water adjustment valve, which causes water to be supplied to the liquid-fuel channel, when the fuel supply state recognition unit recognizes that the gas fuel supply state has been reached. The water purging control unit causes the mid-switch opening amount to be smaller than the pre-switch opening amount so as to cause the second flow rate to be lower than the first flow rate, and determines the post-switch opening amount such that water of a third flow rate, which is higher than the second flow rate, is at least temporarily supplied to the liquid-fuel channel in the gas fuel supply state.

In this purging device, the water is supplied to the liquid-fuel channel of the nozzle even in the fuel switching state. Thus, the coking of the liquid fuel in the liquid-fuel channel can be suppressed in the fuel switching state. Further, in the fuel switching state, the combustion of the liquid fuel and the gas fuel is likely to become unstable. Thus, in this purging device, by supplying water of the low flow rate, namely, water of the second flow rate to the liquid-fuel channel of the nozzle, the combustion stability is secured in the fuel switching state, and also, the corking is inhibited in the fuel switching, state. Further, in this purging device, water of the third flow rate is at least temporarily supplied to the liquid-fuel channel in the gas fuel supply state, the third flow rate being higher than the second flow rate. Thus, cleaning effects on the liquid-fuel channel can be improved in the gas fuel supply state.

Here, in the purging device for the fuel channel, the water purging control unit may determine the post-switch opening amount such that the third flow rate becomes lower than the first flow rate.

Further, in any one of the above-described purging devices for the fuel channel, when the fuel supply state recognition unit recognizes that the gas fuel supply state has been reached, as the post-switch opening amount, the water purging control unit may instruct, to the water adjustment valve, a water replacement opening amount that is the same opening amount as the mid-switch opening amount, such that water of the second flow rate is supplied to the liquid-fuel channel continuously from the fuel switching state. After instructing the water replacement opening amount to the water adjustment valve, the water purging control unit may instruct a cleaning opening amount to the water adjustment valve as the post-switch opening amount, such that water of the third flow rate is supplied to the liquid-fuel channel.

Further, in any one of the above-described purging devices for the fuel channel, as the post-switch opening amount, the water purging control unit may instruct, to the water adjustment valve, an intermittent purging opening amount, which causes water to be intermittently supplied to the liquid-fuel channel.

In the purging device for the fuel channel that determines the cleaning opening amount, after instructing the cleaning opening amount to the water adjustment valve, as the post-switch opening amount, the water purging control unit may instruct, to the water adjustment valve, an intermittent purging opening amount, which causes water to be intermittently supplied to the liquid-fuel channel.

In any one of the above-described purging devices for the fuel channel that determine the cleaning opening amount, the water purging control unit may instruct, to the water adjustment valve, the intermittent purging opening amount, which causes as flow rate of water supplied to the liquid-fuel channel to become the third flow rate.

In any one of the purging devices for the fuel channel, the fuel supply state recognition unit may recognize in advance a timing at which the liquid fuel supply state is switched to the fuel switching state. When the fuel supply state recognition unit recognizes the timing in advance, the water purging control unit may instruct the pre-switch opening amount to the water adjustment valve, which causes a flow rate of water supplied to the liquid-fuel channel to gradually become lower, such that the flow rate of water supplied to the liquid-fuel channel becomes the second flow rate at a timing at which the fuel switching state is reached.

In any one of the above-described purging devices for the fuel channel, the purging device for the fuel channel may further include: an air line that supplies air to the liquid-fuel channel; and an air adjustment valve that adjusts a pressure of the air flowing through the air line. The control device may include an air purging control unit that controls an opening amount of the air adjustment valve. The water purging control unit may instruct the water adjustment valve to close after instructing the post-switch opening amount to the water adjustment valve. When the gas fuel supply state exists and the water adjustment valve is in a closed state, the air purging control unit may instruct, to the air adjustment valve, an air purging opening amount, which causes the air to be supplied to the liquid-fuel channel.

In the purging device for the fuel channel that includes the air purging control unit, the air purging, control unit may instruct, to the air adjustment valve, a low-pressure purging opening amount as the air purging opening amount, which causes air of a first pressure to be supplied to the liquid-fuel channel. After instructing the low-pressure purging opening amount, the air purging control unit may instruct, to the air adjustment valve, a high-pressure purging opening amount as the air purging opening amount, which causes air of a second pressure to be supplied to the liquid-fuel channel, the second pressure being higher than the first pressure.

In any one of the above-described purging devices for the fuel channel that include the air purging control unit, the combustor may include a second nozzle as well as the nozzle that functions as a first nozzle. The second nozzle has formed therein a liquid-fuel channel, through which the liquid fuel flows and which is open at a tip portion of the nozzle, and a gas-fuel channel, through which the gas fuel flows and which is open at the tip portion of the nozzle. The purging device may further include a second air line, which supplies air to the liquid-fuel channel of the second nozzle, as well as a first air line, which is the air line that supplies the air to the liquid-fuel channel of the first nozzle, and a second air adjustment valve that adjusts a pressure of the air flowing through the second air line. The fuel supply state recognition unit may recognize a gas fuel supply state in which, of the liquid fuel and the gas fuel, only the gas fuel is supplied to the second nozzle. When both the first nozzle and the second nozzle are in the gas fuel supply state and while the water purging control unit is instructing the post-switch opening amount, the air purging control unit may instruct, to the second air adjustment valve, an air purging opening amount, which causes the air to be supplied to the liquid-fuel channel of the second nozzle.

In the purging device for the fuel channel in the combustor having the second nozzle, the air purging opening amount of the second air adjustment valve may be instructed to the second air adjustment valve after a predetermined period of time elapses from a timing at which the water purging control unit instructs the post-switch opening amount to the water adjustment valve.

In any one of the above-described purging devices for the fuel channel in the combustor having the second nozzle, the air purging control unit may instruct, to the second air adjustment valve, a low-pressure purging opening amount as the air purging opening amount of the second air adjustment valve, which causes air of a third pressure to be supplied to the liquid-fuel channel of the second nozzle. After instructing the low-pressure purging opening amount to the second air adjustment valve, the air purging control unit may instruct, to the second air adjustment valve, a high-pressure purging opening amount as the air purging opening amount of the second air adjustment valve, which causes air of a fourth pressure to be supplied to the liquid-fuel channel of the second nozzle, the fourth pressure being higher than the third pressure.

In any one of the above-described purging devices for the fuel channel in the combustor having the second nozzle, the second nozzle may be a nozzle that burns fuel sprayed from the second nozzle by diffusion combustion. After instructing the first air purging opening amount, which is the air purging opening amount, to the second air adjustment valve, the air purging control unit may instruct a second air purging opening amount, which causes air of a pressure that is lower than the pressure of the air supplied to the liquid-fuel channel of the second nozzle using the first air purging opening amount to be supplied to the liquid-fuel channel of the second nozzle.

As an aspect according to the present invention for solving the above-described problem, a gas turbine installation includes:

any one of the above-described purging devices for the fuel channel; the combustor; and a turbine that is driven by combustion gas generated by the combustor.

Advantageous Effects of Invention

An aspect according to the present invention can inhibit coking of liquid fuel, while securing stable combustion of fuel in the course of switching the liquid fuel to gas fuel.

DESCRIPTION OF EMBODIMENT

An embodiment of a gas turbine installation according to the present invention will be described below in detail, with reference to the drawings.

Figure 1:
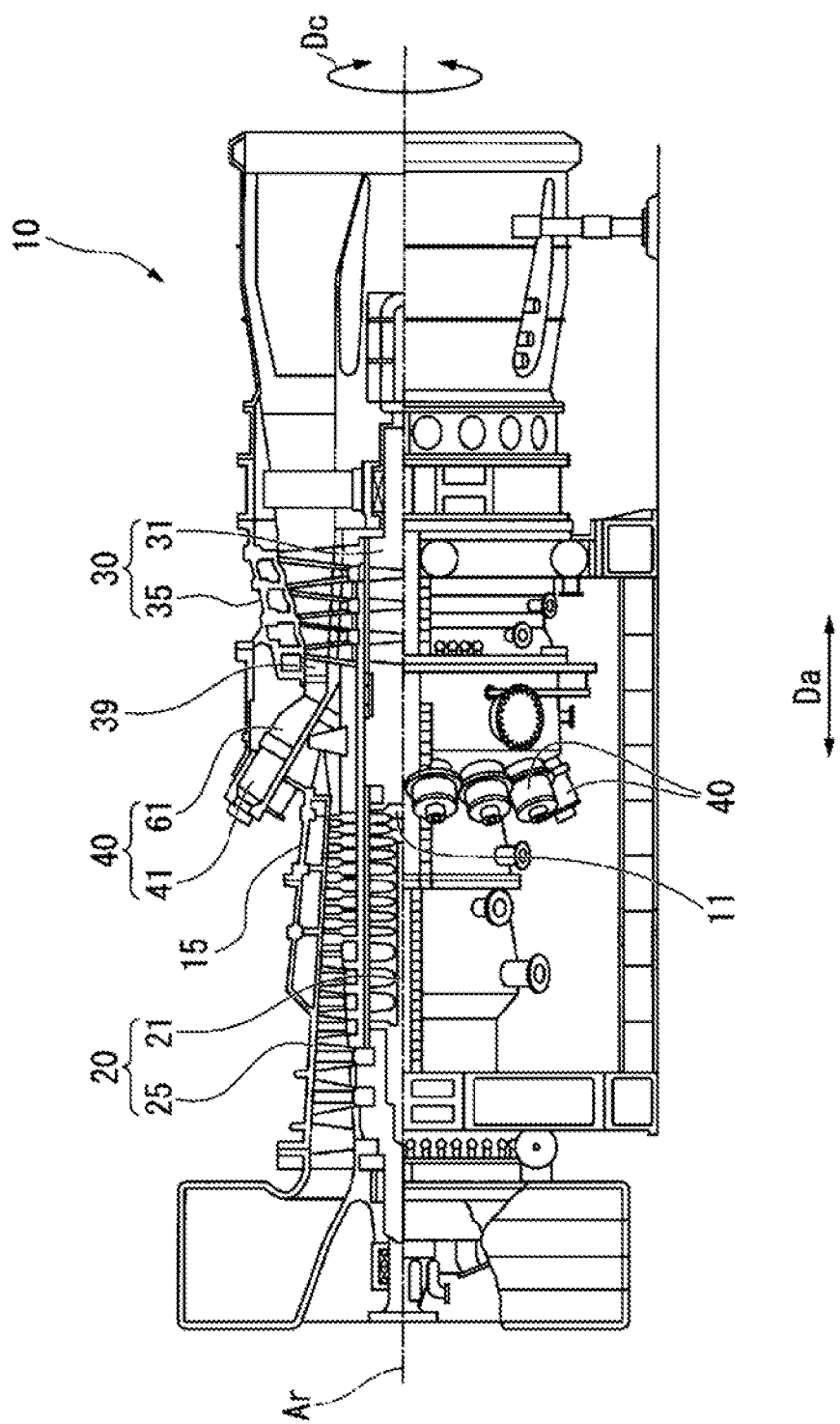
FIG. 1 is an overall cutaway side view of main portions of a gas turbine of an embodiment according to the present invention.

As illustrated in FIG. 1, the gas turbine installation of the present embodiment is provided with a gas turbine 10. A generator (not illustrated) is connected to this gas turbine 10.

The gas turbine 10 includes a compressor 20 that compresses the outside air to generate compressed air, a plurality of combustors 40 that combust fuel in the compressed air to generate combustion gas, and a turbine 30 that is driven by the combustion gas.

The compressor 20 has a compressor rotor 21 that rotates around a rotational axis Ar and a compressor casing 25 that covers the compressor rotor 21 while allowing the compressor rotor 21 to rotate. The turbine 30 has a turbine rotor 31 that rotates around the rotational axis Ar and a turbine casing 35 that covers the turbine rotor 31 while allowing the turbine rotor 31 to rotate. A combustion gas channel 39, through which the combustion gas from the combustor 40 flows, is formed between the inner peripheral side of the turbine casing 35 and the outer peripheral side of the turbine rotor 31. The compressor rotor 21 and the turbine rotor 31 are positioned on the same rotational axis Ar and connected with each other to form a gas turbine rotor 11. A generator rotor of the above-described generator is connected to this gas turbine rotor 11. The compressor casing 25 and the turbine casing 35 are connected with each other to form a gas turbine casing 15.

The plurality of combustors 40 are arranged side-by-side at equal intervals in a circumferential direction Dc with the rotational axis Ar serving as the center, and are fixed to the turbine casing 35. The combustor 40 has a tube 61, in which fuel is combusted, and a fuel injector 41 that sprays fuel into the tube 61. The tube 61 is open at both ends. Part of the fuel injector 41 is inserted into one of the open ends of the tube 61, and the combustion gas channel 39 of the turbine 30 is connected to the other open end thereof.

Figure 2:
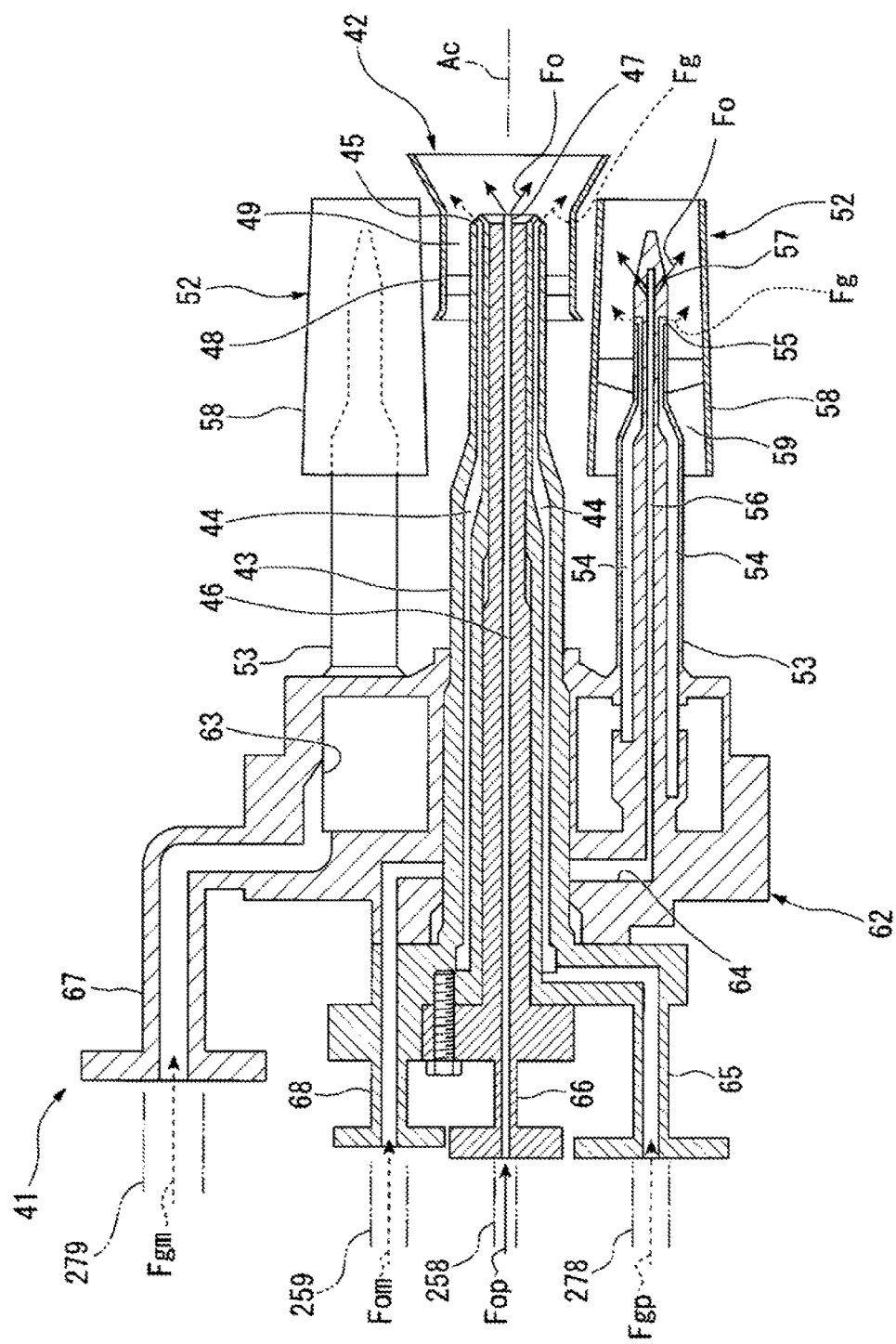
FIG. 2 is a cross-sectional view of a fuel injector of the embodiment according to the present invention.

As illustrated in FIG. 2, the fuel injector 41 has a pilot burner 42 arranged on a combustor axis Ac, a plurality of main burners 52 arranged at equal intervals in the circumferential direction with the combustor axis Ac serving as the center, and a nozzle base 62 fixed to the turbine casing 35. Note that, for ease of explanation below, a direction in which the combustor axis Ac extends will be referred to as a combustor axial direction. One side of the combustor axial, direction will be referred to as a tip end side, and the other side thereof as a base end side.

The pilot burner 42 has a pilot nozzle (a second nozzle) 43 that is long in the combustor axial direction and a cylindrical pilot air tube 48 surrounding the outer periphery of the tip end side of the pilot, nozzle 43. The tip end side of the pilot air tube 48 forms a pilot cone whose diameter gradually becomes larger toward the tip end side. The pilot nozzle 43 is fixed to the nozzle base 62 in a state in which the base end side of the pilot nozzle 43 penetrates through the nozzle base 62. A gas-fuel channel 44, through which gas fuel Fgp, such as natural gas, flows and which has an opening 45 at a tip portion of the pilot nozzle 43, and a liquid-fuel channel 46, through which liquid fuel Fop, such as light oil, flows and which has an opening 47 at the tip portion of the pilot nozzle 43, are formed in the pilot nozzle 43. A gas-fuel receiving tube 65 communicated with the gas-fuel channel 44 and a liquid-fuel receiving tube 66 communicated with the liquid-fuel channel 46 are connected to a base end portion of the pilot nozzle 43. Pilot gas-fuel branch lines 278, which will be described later, are connected to the gas-fuel receiving tube 65, and pilot liquid-fuel branch lines 258, which will be described later, are connected to the liquid-fuel receiving tube 66.

The main burner 52 has a main nozzle 53 that is long in the combustor axial direction and a cylindrical main air tube 58 surrounding the outer periphery of the main nozzle 53. The base end of the main nozzle 53 is fixed to the nozzle base 62. A gas-fuel channel 54, through which gas fuel Fgm flows and which has an opening 55 at a tip portion of the main nozzle 53, and a liquid-fuel channel 56, through which liquid fuel Fom flows and which has an opening 57 at the tip portion of the main nozzle 53, are formed in the main nozzle 53. A gas-fuel channel 63 communicated with the gas-fuel channel 54 of the main nozzle 53 and a liquid-fuel channel 64 communicated with the liquid-fuel channel 56 of the main nozzle 53 are formed in the nozzle base 62. A gas-fuel receiving tube 67 communicated with the gas-fuel channel 63 formed in the nozzle base 62 and a liquid-fuel receiving tube 68 communicated with the liquid-fuel channel 64 formed in the nozzle base 62 are connected to the nozzle base 62. Main gas-fuel branch lines 279, which will be described later, are connected to the gas-fuel receiving tube 67, and main liquid-fuel branch lines 259, which will be described later, are connected to the liquid-fuel receiving tube 68.

The inner peripheral side of the pilot air tube 48 forms a pilot air channel 49 through which the compressed air from the compressor 20 flows. The liquid fuel Fop or the gas fuel Fgp sprayed from the pilot nozzle 43 is combusted (burned by diffusion combustion) in the compressed air, which has passed through the pilot air channel 49, to form a diffusion flame.

The inner peripheral side of the, main air tube 58 forms a main air channel 59 through which the compressed air from the compressor 20 flows. The liquid fuel Fom or the gas fuel Fgm is sprayed into the compressed air flowing through the main air channel 59 from the main nozzle 53 arranged inside the main air channel 59. As a result, premixed gas, which is a mixture of the compressed air and the liquid fuel Fom or the gas fuel Fgm, flows inside the main air channel 59 further to the downstream side than the tip end portion of the main nozzle 53. After flowing out of the main air channel 59, this premixed gas is combusted (burned by premixed combustion) and forms a premixed flame. The above-described diffusion flame fulfills a role of stabilizing this premixed flame.

Figure 3:
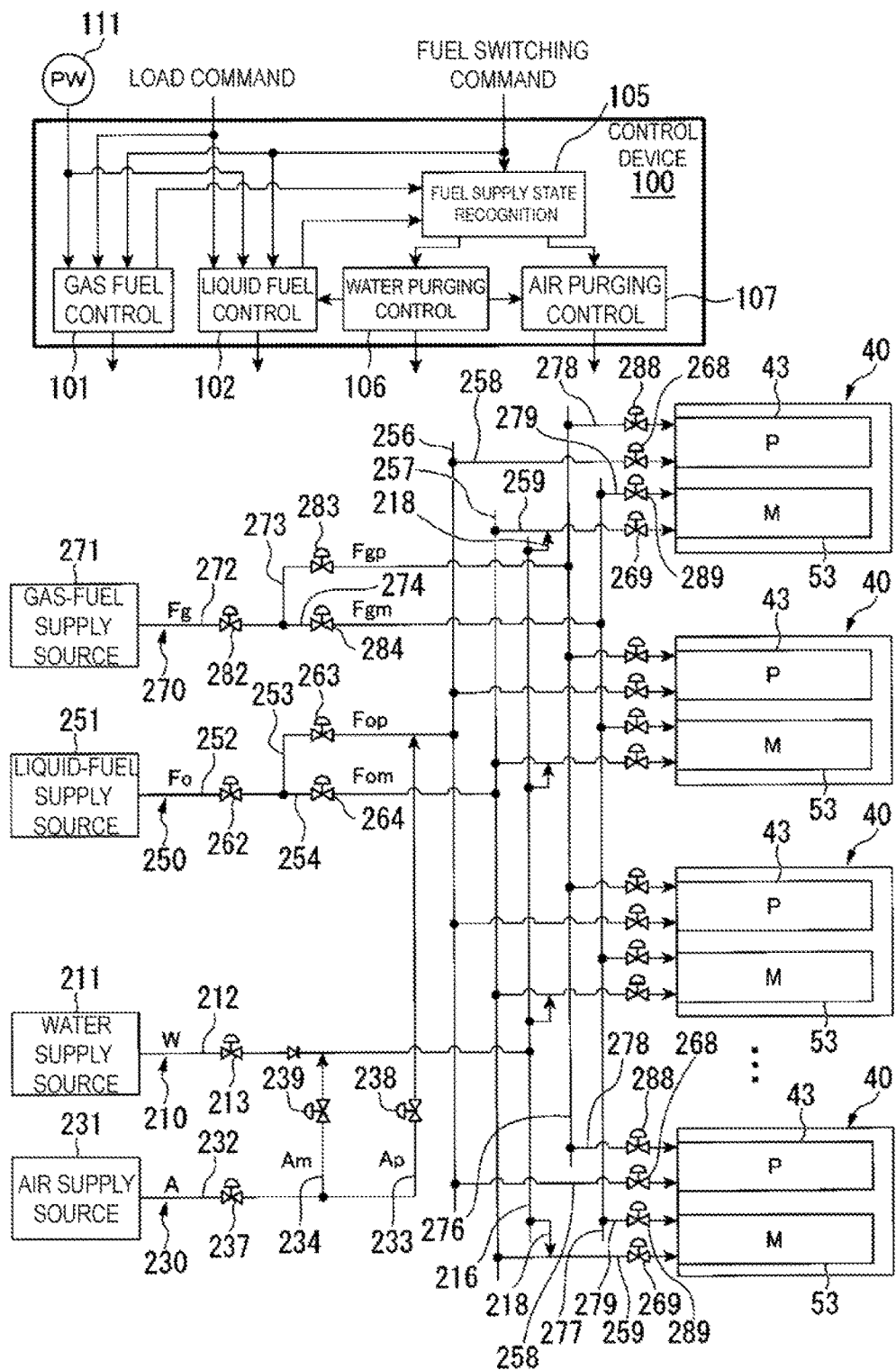
FIG. 3 is an explanatory view illustrating a configuration of a purging device of the embodiment according to the present invention.

As illustrated in FIG. 3, in addition to the above-described gas turbine 10, the gas turbine installation includes a liquid-fuel supply device 250 that supplies liquid fuel Fo to the plurality of combustors 40, a gas-fuel supply device 270 that supplies gas fuel Fg to the plurality of combustors 40, a water purging device 210 that supplies water W to the liquid-fuel channel 56 in the main nozzle (a first nozzle) 53 of the combustor 40, an air purging device 230 that supplies air A to the liquid-fuel channels 56 and 46 in the main nozzle (the first nozzle) 53 and the pilot nozzle (the second nozzle) 43 of the combustor 40, and a control device 100 that controls the liquid-fuel supply device 250, the gas-fuel supply device 270, the water purging, device 210, and the air purging device 230.

The liquid-fuel supply device 250 has a liquid-fuel main line 252 connected to a liquid-fuel supply source 251, a pilot liquid-fuel line 253, a main liquid-fuel line 254, a pilot liquid-fuel distributor 256, a main liquid-fuel distributor 257, the plurality of pilot liquid-fuel branch lines 258, and the plurality of main liquid-fuel branch lines 259. Both the pilot liquid-fuel line 253 and the main liquid-fuel line 254 are lines branching out from the liquid-fuel main line 252. The pilot liquid-fuel distributor 256 is connected to the pilot liquid-fuel line 253. Each of the plurality of pilot liquid-fuel branch lines 258 is provided for each of the pilot nozzles 43 of the plurality of combustors 40, and each is connected to the pilot liquid-fuel distributor 256. The main liquid-fuel distributor 257 is connected to the main liquid-fuel line 254. Each of the plurality of main liquid-fuel branch lines 259 is provided for each of the main nozzles 53 of the plurality of combustors 40, and each is connected to the main liquid-fuel distributor 257.

In the liquid-fuel main line 252, a liquid-fuel main valve 262 is provided that adjusts the flow rate of the liquid fuel Fo flowing through the liquid-fuel main line 252. In the pilot liquid-fuel line 253, a pilot liquid-fuel valve 263 is provided that adjusts the flow rate of the liquid fuel Fop flowing through the pilot liquid-fuel line 253. In each of the plurality of pilot liquid-fuel branch lines 258, a pilot liquid-fuel branch valve 268 is provided that adjusts the flow rate of the liquid fuel Fop flowing through each of the pilot liquid-fuel branch lines 258. In the main liquid-fuel line 254, a main liquid-fuel valve 264 is provided that adjusts the flow rate of the liquid fuel Fom flowing through the main liquid-fuel line 254. In each of the plurality of main liquid-fuel branch lines 259, a main liquid-fuel branch valve 269 is provided that adjusts the flow rate of the liquid fuel Fom flowing through each of the main liquid-fuel branch lines 259.

The gas-fuel supply device 270 has a gas-fuel main line 272 connected to a gas-fuel supply source 271, a pilot gas-fuel line 273, a main gas-fuel line 274, a pilot gas-fuel distributor 276, a main gas-fuel distributor 277, the plurality of pilot gas-fuel branch lines 278, and the plurality of main gas-fuel branch lines 279. Both the pilot gas-fuel line 273 and the main gas-fuel line 274 are lines branching out from the gas-fuel main line 272. The pilot gas-fuel distributor 276 is connected to the pilot gas-feel line 273. Each of the plurality of pilot gas-fuel branch lines 278 is provided for each of the pilot nozzles 43 of the plurality of combustors 40, and each is connected to the pilot gas-fuel distributor 276. The main gas-fuel distributor 277 is connected to the main gas-fuel line 274. Each of the plurality of main gas-fuel branch lines 279 is provided for each of the main nozzles 53 of the plurality of combustors 40, and each is connected to the main gas-fuel distributor 277.

In the gas-fuel main line 272, a gas-fuel main valve 282 is provided that adjusts the flow rate of the gas fuel Fg flowing through the gas-fuel main line 272, in the pilot gas-fuel line 273, a pilot gas-fuel valve 283 is provided that adjusts the flow rate of the gas fuel Fgp flowing through the pilot gas-fuel line 273. In each of the plurality of pilot gas-fuel branch lines 278, a pilot gas-fuel branch valve 288 is provided that adjusts the flow rate of the liquid fuel Fgp flowing through each of the pilot gas-fuel branch lines 278. In the main gas-fuel line 274, a main gas-fuel valve 284 is provided that adjusts the flow rate of the gas fuel Fgm flowing through the main gas-fuel line 274. In each of the plurality of main gas-fuel branch lines 279, a main gas-fuel branch valve 289 is provided that adjusts the flow rate of the liquid fuel Fgm flowing through each of the main gas-fuel branch lines 279.

The water purging device 210 has a water supply source 211, a water main line 212, a water distributor 216, and a plurality of water branch lines 218. The water supply source 211 has a pump that pressurizes water and supplies the water to the water main line 212. The water main line 212 is connected to this water supply source 211. The water distributor 216 is connected to the water main line 212. Each of the plurality of water branch lines 218 is provided for each of the plurality of main liquid-fuel branch lines 259. One end of the water branch line 218 is connected to the main liquid-fuel branch line 259, and the other end thereof is connected to the water distributor 216. In the water main line 212, a water adjustment valve 213 is provided that adjusts the flow rate of the water W flowing through the water main line 212.

The air purging device 230 has an air supply source 231, an air main line 232, a pilot air line 233, and a main air line 234. The air supply source 231 has a purging compressor that pressurizes air and supplies the air to the air main line 232. The air main line 232 is connected to this air supply source 231. Both the pilot air line 233 and the main air line 234 are lines branching out from the air main line 232. The pilot air line 233 is connected to the pilot liquid-fuel line 253. The main air line 234 is connected to the water main line 212. In the air main line 232, an air main valve 237 is provided that adjusts the flow rate of the air A flowing through the air main line 232. In the pilot air line 233, a pilot air adjustment valve 238 is provided that adjusts the flow rate of air Ap flowing through the pilot air line 233. In the main air line 234, a main air adjustment valve 239 is provided that adjusts the flow rate of air Am flowing through the main air line 234.

The control device 100 has a gas-fuel control unit 101 that controls the gas fuel Fg supplied to the combustors 40, a liquid-fuel control unit 102 that controls the liquid fuel Fo supplied to the combustors 40, a fuel supply state recognition unit 105 that recognizes a state of fuel supply to the combustors 40, a water purging control unit 106 that controls an opening amount of the water adjustment valve 213 in accordance with the fuel supply state, and an air purging control unit 107 that controls opening amounts of the pilot air adjustment valve 238 and the main air adjustment valve 239 in accordance with the fuel supply state. Note that this control device 100 is configured by a computer.

A purging device of the present embodiment is configured by the water purging device 210, the air purging device 230, and the fuel supply state recognition unit 105, the water purging control unit 106, and the air purging control unit 107 of the control device 100.

Next, while describing operations of the control device 100, operations of various devices and the like corresponding to the operations of the control device 100 will be described.

While the gas turbine 10 is being operated, the gas-fuel control unit 101 and the liquid-fuel control unit 102 of the control device 100 control the flow rates of the fuels supplied to the combustors 40 of the gas turbine 10.

Specifically, the gas-fuel control unit 101 first calculates a total flow rate of the gas fuel Fg in accordance with a generator output detected by an output meter 111, and a load command and the like from a host device. The gas-fuel control unit 101 calculates a flow rate ratio between the gas fuel Fg flowing through the pilot gas-fuel line 273 and the gas fuel Fg flowing through the main gas-fuel line 274, both of which branch out from the gas-fuel main line 272, in accordance with the total flow rate of the gas fuel Fg or an inlet temperature of the turbine 30 and the like. Further, the liquid-fuel control unit 102 calculates a total flow rate of the liquid fuel Fo in accordance with the generator output detected by the output meter 111 and the load command and the like from the host device. The liquid-fuel control unit 102 calculates a flow rate ratio between the liquid fuel Fo flowing through the pilot liquid-fuel line 253 and the liquid fuel Fo flowing through the main liquid-fuel line 254, both of which branch out from the liquid-fuel main line 252, in accordance with the total flow rate of the liquid fuel Fo or the inlet temperature of the turbine 30 and the like.

The gas-fuel control unit 101 transmits an opening amount command to the gas-fuel main valve 282, the pilot gas-fuel valve 283, and the main gas-fuel valve 284. Upon receiving, from the host device, a fuel switching command indicating burning of the gas fuel, the gas-fuel control unit 101 transmits, to the gas-fuel main valve 282, the opening amount command corresponding to the total flow rate of the gas fuel Fg. Further, the gas-fuel control unit 101 transmits, to each of the gas-fuel valves 283 and 284, the opening amount command corresponding to the flow rate of each of the gas-fuel lines 273 and 274 determined by the total flow rate of the gas fuel Fg and the above-described flow rate ratio. As a result, the gas fuel Fg of a predetermined flow rate flows into each of the pilot gas-fuel line 273 and the main gas-fuel line 274. The gas fuel Fgp that has flowed through the pilot gas-fuel line 273 passes through the pilot gas-fuel distributor 276 and the pilot gas-fuel branch lines 278, then flows into the gas-fuel channel 44 of the pilot nozzle 43 of each of the combustors 40, and is sprayed into the tubes 61 from the pilot nozzles 43. The gas fuel Fgm that has flowed through the main gas-fuel line 274 passes through the main gas-fuel distributor 277 and the main gas-fuel branch lines 279, then flows into the gas-fuel channel 54 of the main nozzle 53 of each of the combustors 40, and is sprayed into the tubes 61 from the main nozzles 53.

Meanwhile, upon receiving, from the host device, the fuel switching command indicating burning of the gas fuel, the liquid-fuel control unit 102 transmits the opening amount command indicating a "zero" opening amount, namely, a valve closing command, to the liquid-fuel main valve 262, the pilot liquid-fuel valve 263, and the main liquid-fuel valve 264. As a result, the liquid fuel Fo stops being sprayed from the pilot nozzle 43 and the main nozzle 53 of each of the combustors 40.

Upon receiving, from the host device, a fuel switching command indicating burning of the liquid fuel, the liquid-fuel control unit 102 transmits, to the liquid-fuel main valve 262, the opening amount command corresponding to the total flow rate of the liquid fuel Fo. Further, the liquid-fuel control unit 102 transmits, to each of the gas-fuel valves 263 and 264, the opening amount command corresponding to the flow rate of each of the liquid-fuel lines 253 and 254 determined by the total flow rate of the liquid fuel Fg and the above-described flow rate ratio. As a result, the liquid fuel Fo of a predetermined flow rate flows into each of the pilot liquid-fuel line 253 and the main liquid-fuel line 254. The gas fuel Fop that has flowed through the pilot liquid-fuel line 253 passes through the pilot liquid-fuel distributor 256 and the pilot liquid-fuel branch lines 258, then flows into the liquid-fuel channel 46 of the pilot nozzle 43 of each of the combustors 40, and is sprayed into the tubes 61 from the pilot nozzles 43. The liquid fuel Fom that has flowed through the main liquid-fuel line 254 passes through the main liquid-fuel distributor 257 and the main liquid-fuel branch lines 259, then flows into the liquid-fuel charnel 56 of the main nozzle 53 of each of the combustors 40, and is sprayed into the tubes 61 from the main nozzles 53.

Meanwhile, upon receiving, from the host device, the fuel switching command indicating burning of the liquid fuel, the gas-fuel control unit 101 transmits the opening amount command indicating the "zero" opening amount, namely, the valve closing command, to the gas-fuel main valve 282, the pilot gas-fuel valve 283, and the main gas-fuel valve 284. As a result, the gas fuel Fg stops being sprayed from the pilot nozzle 43 and the main nozzle 53 of each of the combustors 40.

The fuel supply state recognition unit 105 recognizes a liquid fuel supply state Mo, in which, of the gas fuel Fg and the liquid fuel Fo, only the liquid fuel Fo is being supplied to the main nozzles 53, a gas fuel supply state Mg, in which only the gas fuel Fg is being supplied to the main nozzles 53, and a fuel switching state Mc which is a state of transition from the liquid fuel supply state Mo to the gas fuel supply state Mg. Further, the fuel supply state recognition unit 105 recognizes a liquid fuel supply state Po, in which, of the gas fuel Fg and the liquid fuel Fo, only the liquid fuel Fo is being supplied to the pilot nozzles 43, a gas fuel supply state Pg, in which only the gas fuel Fg is being supplied to the pilot nozzles 43, and a fuel switching state Pc, which is a state of transition from the liquid fuel supply state Po to the gas fuel supply state Pg. The fuel supply state recognition unit 105 recognizes each of the above-described states in accordance with commands and the like output from the gas-fuel control unit 101 and the liquid-fuel control unit 102.

When the fuel supply state recognition unit 105 recognizes that the fuel supply state is the liquid fuel supply state Mo, the water purging control unit 106 instructs, to the water adjustment valve 213, a pre-switch opening amount that causes water W of a first flow rate w1 to be supplied to the liquid-fuel channels 56 of the main nozzles 53. As a result, the water W from the water supply source 211 flows into the main liquid-fuel branch lines 259 via the water main line 212, the water distributor 216, and the water branch lines 218. The water W that has flowed into the main liquid-fuel branch lines 259 flows into the liquid-fuel channel 56 of the main nozzle 53 of each of the combustors 40 along with the liquid fuel Fom flowing through the main liquid-fuel branch lines 259, and is sprayed into the tubes 61 from the main nozzles 53.

In the liquid fuel supply state Mo, the water W, which is sprayed into the tubes 61 from the liquid-fuel channels 56 of the main nozzles 53, diffuses the liquid fuel Fom, which is sprayed into the tubes 61 from the liquid-fuel channels 56 of the main nozzles 53 in the same way as the water W. Further, the water W contributes to a reduction of a metal temperature of the tubes 61 and reduction of thermal NOx by lowering a temperature of the premixed flame formed as a result of the liquid fuel Fom sprayed from the main nozzles 53 being combusted. Further, since the water W flows into the combustion gas channel 39 of the turbine 30 in the form of steam, the water W also contributes to an improvement in output of the gas turbine.

Figure 4:
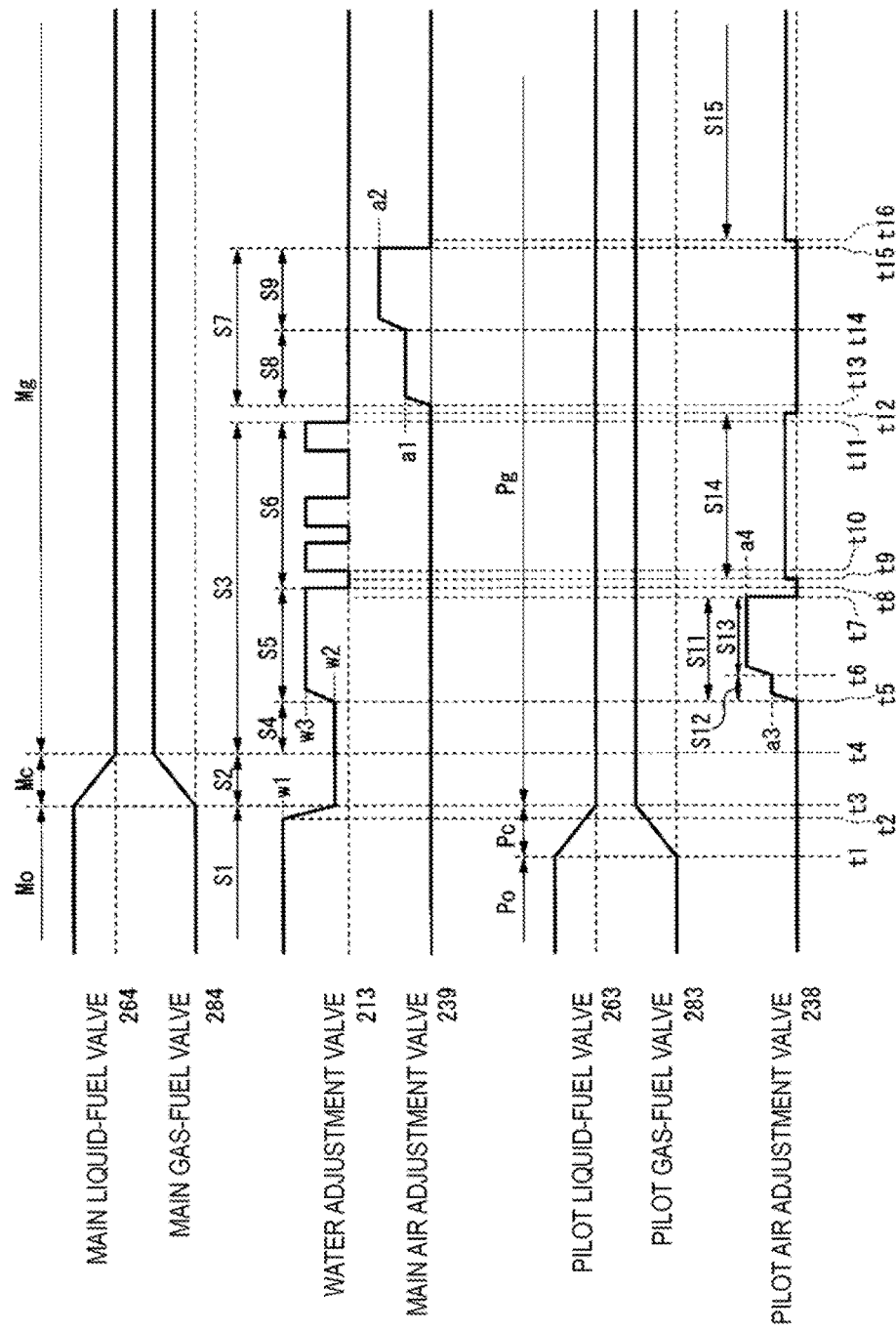
FIG. 4 is a timing chart illustrating operation timings of each of valves of the embodiment according to the present invention.

Next, with reference to a timing chart illustrated in FIG. 4, operations of various valves in the course of switching from the liquid fuel burning to the gas fuel burning will be described.

During the liquid fuel burning, each of the main liquid-fuel valve 264 and the pilot liquid-fuel valve 263 is open to the opening amount corresponding to the command from the liquid-fuel control unit 102. Thus, the liquid fuel Fo is sprayed from the main nozzle 53 and the pilot nozzle 43 of each of the combustors 40. On the other hand, each of the main gas-fuel valve 284 and the pilot gas-fuel valve 283 is closed. Thus, the gas fuel Fg is not sprayed from the main nozzle 53 and the pilot nozzle 43 of each of the combustors 40. Specifically, both the main nozzles 53 and the pilot nozzles 43 are in the liquid fuel supply states Mo and Po, respectively.

At this time, as described above, the water adjustment valve 213 of the water purging device 210 is open at the pre-switch opening amount that causes water W of the first flow rate w1 to be supplied to the liquid-fuel channels 56 of the main nozzles 53 (S1: a water supplying step). Thus, when the main nozzles 53 are in the liquid fuel supply state Mo, the water W from the water supply source 211 flows into the main liquid-fuel branch lines 259 via the water main line 212, and the water distributor 216. The water that has flowed into the main liquid-fuel branch lines 259 flows into the liquid-fuel channel 56 of each of the main nozzles 53, and is sprayed into the tubes 61 from the main nozzles 53. In the present embodiment, the first flow rate w1 is a flow rate having a constant ratio with respect to the flow rate of the liquid fuel Fom supplied to the liquid-fuel channels 56 of the main nozzles 53. Thus, when the flow rate of the liquid fuel Fom supplied to the liquid-fuel channels 56 of the main nozzles 53 changes in response to a change in the load command, the first flow rate w1 also changes in accordance with this change. Note that, during the water supplying step (S1), the first flow rate w1 may be a constant flow rate.

When the fuel switching command is input, into the control device 100 from the outside (t1), the pilot liquid-fuel valve 263 starts closing in accordance with an instruction from the liquid-fuel control unit 102, and at the same time, the pilot gas-fuel valve 283 starts opening in accordance with an instruction from the gas-fuel control unit 101. Thus, the liquid fuel Fop sprayed from the pilot nozzles 43 starts decreasing, and at the same time, the gas fuel Fgp starts to be sprayed from the pilot, nozzles 43. Specifically, the state of the pilot nozzle 43 of each of the combustors 40 switches from the liquid fuel supply state Po to the fuel switching state Pc.

After that (t3), when the pilot liquid-fuel valve 263 is completely closed, and the pilot gas-fuel valve 283 reaches the opening amount corresponding to the instruction from the gas-fuel control unit 101, the liquid fuel Fop stops being sprayed from the pilot nozzles 43, and at the same time, the gas fuel Fgp starts to be sprayed at a predetermined flow rate from the pilot nozzles 43. Specifically, the state of the pilot nozzle 43 of each of the combustors 40 switches from the fuel switching state Pc to the gas fuel supply state Pg.

When the pilot nozzle 43 of each of the combustors 40 enters the gas fuel supply state Pg (t3), the main liquid-fuel valve 264 starts closing in accordance with the instruction from the liquid-fuel control unit 102, and at the same time, the main gas-fuel valve 284 starts opening in accordance with the instruction from the gas-fuel control unit 101. Thus, the liquid fuel Fom sprayed from the main nozzles 53 starts decreasing, and at the same time, the gas fuel Fgm starts to be sprayed from the main nozzles 53. Specifically, the state of the main nozzle 53 of each of the combustors 40 switches from the liquid fuel supply state Mo to the fuel switching state Mc.

After that (t4), when the main liquid-fuel valve 264 is completely closed, and the main gas-fuel valve 284 reaches the opening amount corresponding to the instruction from the gas-fuel control unit 101, the liquid fuel Fom stops being sprayed from the main nozzles 53, and at the same time, the gas fuel Fgm starts to be sprayed at a predetermined flow rate from the main nozzles 53. Specifically, the state of the main nozzle 53 of each of the combustors 40 switches from the fuel switching state Mc to the gas fuel supply state Mg.

The fuel supply state recognition unit 105 of the control device 100 recognizes, in advance, the timing (t3) at which the main nozzles 53 are switched to the fuel switching state Mc, and instructs the pre-switch opening amount to the water adjustment valve 213, such that water of a second flow rate w2 flows into the liquid-fuel channels 56 of the main nozzles 53 at the timing (t3) which the main nozzles 53 enter the fuel switching state Mc. Specifically, from the timing (t2), which is before the timing (t3) at which the main nozzles 53 enter the fuel switching state Mc, the pre-switch opening amount starts to gradually change from the opening amount that causes water W of the first flow rate w1 to flow through the liquid-fuel channels 56 of the main nozzles 53 to the opening amount that causes water W of the second flow rate w2 flow through the liquid-fuel channels 56 of the main nozzles 53. The fuel supply state recognition unit 105 retains, in advance, information on a time period from when the fuel supply state recognition unit 105 receives the fuel switching command from the outside (t1) to when the main nozzles 53 switch to the fuel switching state Mc. Using this information, the fuel supply state recognition unit 105 recognizes in advance the timing (t3) at which the main nozzles 53 switch to the fuel switching state Mc.

When the fuel supply state recognition unit 105 recognizes that the main nozzles 53 are in the fuel switching state Mc (t3), the water purging control unit 106 instructs, to the water adjustment valve 213, a mid-switch opening, amount that causes the above-described water of the second flow rate w2 to flow into the liquid-fuel channels 56 of the main nozzles 53 (S2: a mid-switch water purging step). The second flow rate w2 is constant while the main nozzles 53 are in the fuel switching state Mc. As described above, although the above-described first flow channel w1 changes depending on the flow rate of the liquid fuel Fom, the first flow rate w1 is higher than the second flow rate w2 in all cases. In other, words, the second flow rate w2 is lower than the first flow rate w1.

When the fuel supply state recognition unit 105 recognizes that the main nozzles 53 are in the gas fuel supply state Mg (t4), the water purging control unit 106 instructs a post-switch opening amount to the water adjustment valve 213 (S3: a post-switch water purging step). As the post-switch opening amount, for a predetermined period of time from the tinting at which the main nozzles 53 are recognized as being in the gas fuel supply state Mg (t4), a water replacement opening amount is instructed to the water adjustment valve 213 (S4: a water replacement step), the water replacement opening amount being the same opening amount as the opening amount that causes water W of the second flow rate w2 to flow into the liquid-fuel channels 56 of the main nozzles 53, namely, the same as the mid-switch opening amount. Then, after the predetermined period of time has elapsed (t5), as the post-switch opening amount, a cleaning opening amount, which is an opening amount that causes water W of a third flow rate w3 to flow into the liquid-fuel channels 56 of the main nozzles 53, is instructed to the water adjustment valve 213 for a predetermined period of time (S5: a cleaning step). The third flow rate w3 is constant during this predetermined period of time. As described above, although the above-described first flow channel w1 changes depending on the flow rate of the liquid fuel Fom, the first flow rate w1 is higher than the third flow rate w3 in all cases. Further, the third flow rate w3 is higher than the second flow rate w2. Thus, the third flow rate w3 is lower than the first flow rate w1 and higher than the second flow rate w2.

After the cleaning opening amount, which causes water W of the third flow rate w3 to flow into the liquid-fuel channels 56 of the main nozzles 53, is instructed for the predetermined period of time to the water adjustment valve 213 (t8), as the post-switch opening amount, a "zero" opening amount is instructed to the water adjustment valve 213, and after that (t10), as the post-switch opening amount, the opening amount that causes water W of the third flow rate w3 to flow into the liquid-fuel channels 56 of the main nozzles 53 is instructed to the water adjustment valve 213 for a predetermined period of time. Thereafter, as the post-switch opening amount, an intermittent purging opening amount, by which the "zero" opening amount and the opening amount that causes water W of the third flow rate w3 to flow into the liquid-fuel channels 56 of the main nozzles 53 are repeated alternately, is instructed to the water adjustment valve 213. As a result, water of the third flow rate w3 is intermittently supplied to the liquid-fuel channels 56 of the main nozzles 53 (S6: an intermittent purging step).

With this, the post-switch water purging step (S3) ends. When the post-switch water purging step (S3) ends, this is notified from the water purging control unit 106 to the air purging control unit 107. After receiving the notification (t13), the air purging control unit 107 instructs, to the main air adjustment valve 239, an air purging opening amount that causes the air A to flow into the liquid-fuel channels 56 of the main nozzles 53 (S7: an air purging step). As a result, the air A from the air supply source 231 flows into the water main line 212 from the main air line 234. The air A that has flowed into the water main line 212 flows into the liquid-fuel channel 56 of each of the main nozzles 53 via the water distributor 216 and the main liquid-fuel branch lines 259, and is sprayed into the tubes 61 from the main nozzles 53.

As the air purging opening amount, first, a low-pressure purging opening amount, which causes the air A of a first pressure a1 to be supplied to the liquid-fuel channels 56 of the main nozzles 53, is instructed to the main air adjustment valve 239 (S8: a low-pressure purging step). Then, after a predetermined period of time elapses (t14), as the air purging opening amount, a high-pressure purging opening amount, which causes the air A of a second pressure a2 to be supplied to the liquid-fuel channels 56 of the main nozzles 53, is instructed to the main air adjustment valve 239 for a predetermined period of time, the second pressure a2 being higher than the first pressure a1 (S9: a high-pressure purging step).

With this, purging processing for the liquid-fuel channels 56 of the main nozzles 53 ends.

After a predetermined period of time elapses from the timing at which the pilot nozzles 43 and the main nozzles 53 respectively enter the gas fuel supply states Pg and Mg (t4), the air purging control unit 107 instructs, to the pilot air adjustment valve 238, an air purging opening amount that causes the air A to flow into the liquid-fuel channels 46 of the pilot nozzles 43 (t5). In other words, after the predetermined period of time elapses from the timing at which the post-switch water purging step (S3) for the main nozzles 53 is started (t4), the air purging control unit 107 instructs a first air purging opening amount to the pilot air adjustment valve 238 (t5). As a result, the air A from the air supply source 231 flows into the pilot liquid-fuel line 253 from the pilot air line 233. The air A that has flowed into the pilot liquid-fuel line 253 flows into the liquid-fuel channel 46 of each of the pilot nozzles 43 via the pilot liquid-fuel distributor 256 and the pilot liquid-fuel branch lines 238, and is sprayed into the tubes 61 from the pilot nozzles 43 (S11: a first air purging step).

As the first air purging opening amount, first, the low-pressure purging opening amount, which causes the air A of a third pressure a3 to be supplied to the liquid-fuel channels 46 of the pilot nozzles 43, is instructed to the pilot air adjustment valve 238 (S12: a low-pressure purging step). Then, after a predetermined period of time elapses (t6), as the first air purging opening amount, a high-pressure purging opening amount, which causes the air A of a fourth pressure a4 to be supplied to the liquid-fuel channels 46 of the pilot nozzles 43, is instructed to the pilot air adjustment valve 238 for a predetermined period of time, the fourth pressure a4 being higher than the third pressure a3 (S13: a high-pressure purging step).

The timing (t5) at which the air A of the third pressure a3 is supplied to the liquid-fuel channels 46 of the pilot nozzles 43 matches a timing at which the cleaning step (S5) is started for the main nozzles 53. Further, the high-pressure purging stop for the pilot nozzles 43 (S13) ends before a timing (t8) at which the cleaning step (S5) for the main nozzles 53 ends (t7). With this, the first air purging step (S11) ends.

After the timing (t8) at which the cleaning step (S5) for the main nozzles 53 ends, when a timing (t9), which is before a timing (t10) at which the first water supply is started in the intermittent purging step (S6) for the main nozzles 53, is reached, the air purging control unit 107 instructs a second air purging opening amount to the pilot air adjustment valve 238 (S14: a second air purging step). After a timing (t11) at which the intermittent purging step (S6) for the main nozzles 53 ends, when a timing (t12), which is before a timing (t13) at which the air purging step (S7) for the main nozzles 53 is started, is reached, the air purging control unit 107 instructs the "zero" opening amount to the pilot air adjustment valve 238, and causes the second air purging step (S14) to end. The second air purging opening amount is constant during the second air purging step (S14) and is smaller than the first air purging opening amount at any point of time. Thus, during the second air purging step (S14), the pressure of the air supplied to the liquid-fuel channels 46 of the pilot nozzles 43 is lower than the third pressure a3 and the fourth pressure a4 applied during the first air purging step (S11).

When a timing (t16), which is after a timing (t15) at which the air purging step (S7) for the main nozzles 53 ends, is reached, the air purging control unit 107 once more instructs the second air purging opening amount to the pilot air adjustment valve 238 (S15: a second air purging step). Thereafter, while the pilot nozzles 43 are in the gas fuel supply state Pg, the pilot air adjustment valve 238 maintains the second air purging opening amount.

As in the present embodiment, in the combustor 40 having the nozzles 43 and 53 that selectively spray the liquid fuel Fo, such as light oil, and the gas fuel Fg, such as natural gas, if the liquid fuel Fo remains in the liquid-fuel channels 46 and 56 of the nozzles 43 and 53 after the fuel to be used is switched from the liquid fuel Fo to the gas fuel Fg, coking of this liquid fuel Fo may occur under a high-temperature environment.

Thus, in the present embodiment, when the state of the main nozzles 53 switches from the liquid fuel supply state Mo to the gas fuel supply state Mg, the post-switch water purging step (S3) is performed so as to clean the interior of the liquid-fuel channels 56 of the main nozzles 53 using water. In the cleaning step (S5) of the post-switch water purging step (S3), at the time of the gas fuel supply state Mg, water of the third flow rate w3 is supplied to the liquid-fuel channels 56 of the main nozzles 53 so as to improve the performance of cleaning the interior of the liquid-fuel channels 56 of the main nozzles 53. Here, the third flow rate w3 is a maximum flow rate or a flow rate close to the maximum flow rate within a range that does not impair the combustion stability of the gas fuel Fg even when the water W is sprayed from the main nozzles 53.

However, if water of a high flow rate is supplied to the liquid-fuel channels 56 of the main nozzles 53 immediately after the gas fuel supply state Mg is reached (t4), the liquid fuel Fom accumulated inside the main liquid-fuel branch lines 259 and the liquid-fuel channels 56 of the main nozzles 53 sprays out from the main nozzles 53 in a large quantity. As a result, an amount of the fuel combusted inside the tube 61 suddenly increases, and consequently, the combustion amount suddenly increases, and the combustion stability deteriorates. Thus, in the present embodiment, for a predetermined period of time from the timing (t4) immediately after the gas fuel supply state Mg is reached until a timing at which an amount of water that can replace the liquid fuel Fom accumulated inside the main liquid-fuel branch lines 259 and the liquid-fuel channels 56 of the main nozzles 53 is completely supplied, water W of the second flow rate w2, which is lower than the third flow rate w3, is supplied to the liquid-fuel channels 56 of the main nozzles 53 (S4: the water replacement step).

When almost all of the liquid fuel Fom accumulated inside the main liquid-fuel branch lines 259 and the liquid-fuel channels 56 of the main nozzles 53 is replaced with the water W, water of the third flow rate, which is higher than the second flow rate, is supplied to the liquid-fuel channels 56 of the main nozzles 53 so as to promote the removal of a small amount of the liquid fuel Fom still remaining therein.

Depending on the shape of the liquid-fuel channel 56 of the main nozzle 53, even after the cleaning step (S5) is performed on the main nozzles 53, in some cases, the liquid fuel Fom inside the liquid-fuel channels 56 of the main nozzles 53 cannot be sufficiently removed. For example, when the liquid-fuel channel 56 of the main nozzle 53 has an acute-angled section, or when there is a gap and the like in the liquid-fuel channel 56 of the main nozzle 53, even after the cleaning step (S5) is performed on the main nozzles 53, in many cases, the liquid fuel Fom inside the liquid-fuel channels 56 of the main nozzles 53 cannot be sufficiently removed. Thus, in the present embodiment, after the cleaning step (S5), the intermittent purging step (S6) is performed in which water W of the third flow rate w3 is caused to intermittently flow into the liquid-fuel channels 56. In this way, by causing the water W to intermittently flow into the liquid-fuel channels 56, while the water is not flowing into the liquid-fuel channels 56, the liquid fuel Fom flows out from the acute-angled section, the gap and the like of the liquid-fuel channels 56. After that, this liquid fuel Fom is removed by the water supplied to the liquid-fuel channels 56.

For example, in this intermittent purging step (S6), the number of times that the water W is caused to intermittently flow is approximately five. Note that if the liquid fuel Fom inside the liquid-fuel channels 56 of the main nozzles 53 cannot be sufficiently removed by causing the water W to intermittently flow five times, the water W may be caused to flow ten times, for example. Further, if the liquid fuel Fom inside the liquid-fuel channels 56 of the main nozzles 53 can be sufficiently removed by causing the water W to intermittently flow less than five times, the water W may be caused to flow less than five times. Furthermore, if the liquid fuel Fom inside the liquid-fuel channels 56 of the main nozzles 53 can be sufficiently removed by performing the cleaning step (S5), the intermittent purging step (S6) may be omitted.

When the water W remains inside the liquid-fuel channels 56 of the main nozzles 53, and if the water W drops at a high temperature onto the tubes 61 in the form of water droplets, the tubes 61 may be damaged. Thus, in the present embodiment, after the post-switch water purging step (S3), the air A is supplied to the liquid-fuel channels 56 of the main nozzles 53, and the air A is sprayed into the tubes 61, along with the water W, from the liquid-fuel channels 56 of the main nozzles 53 (S7: the air purging step).

If the air A having a high pressure is supplied to the liquid-fuel channels 56 from the start of the air purging step (S7), the water W accumulated inside the main liquid-fuel branch lines 259 and the liquid-fuel channels 56 of the main nozzles 53 sprays out from the main nozzles 53 in a large quantity. As a result, an amount of the water W sprayed into the tubes 61 suddenly increases, and consequently, the combustion stability of the gas fuel Fg deteriorates. Thus, in the present embodiment, for the predetermined period of time until an amount of the air A that can replace the water W accumulated inside the main liquid-fuel branch lines 259 and the liquid-fuel channels 56 of the main nozzles 53 is completely supplied, the air A of the first pressure a1, which is a low pressure, is supplied to the liquid-fuel channels 56 of the main nozzles 53 (S8: the low-pressure purging step). After that, in order to cause a small amount of the water W remaining inside the liquid-fuel channels 56 of the main nozzles 53 to be sprayed into the tubes 61, the air A of the second pressure a2, which is a high pressure, is supplied to the liquid-fuel channels 56 of the main nozzles 53 (S9: the high-pressure purging step).

As described above, in the present embodiment, when the gas fuel supply state Mg is reached (t4), the water replacement step (S4) is performed, and then the cleaning step (S5) is performed. Thus, the combustion stability of the gas fuel Fg can be secured, and at the same time, the performance of cleaning the liquid-fuel channels 56 of the main nozzles 53 can be improved. Further, in the present embodiment, since the intermittent purging step (S7) is performed after the cleaning step (S5), the performance of cleaning the liquid-fuel channels 56 of the main nozzles 53 can be further improved.

Incidentally, in the fuel switching state Mc in which the liquid fuel Fom is switched to the gas fuel Fgm, since the flow rate of the liquid fuel Fom flowing into the liquid-fuel channels 56 of the main nozzles 53 gradually becomes lower, a flow velocity of the liquid fuel Fom flowing through the liquid-fuel channels 56 gradually decreases. In particular, when the fuel switching state Mc has nearly become the gas fuel supply state Mg, the flow velocity of the liquid fuel Fom flowing through the liquid-fuel channels 56 decreases significantly. Thus, even in the fuel switching state Mc, coking of the liquid fuel Fom may occur inside the liquid-fuel channels 56.

In the present embodiment, in order to inhibit the coking of the liquid fuel Fom in the fuel switching state Mc, even in the fuel switching state Mc, the water W is supplied to the liquid-fuel channels 56 of the main nozzles 53 (S2: the mid-switch water purging step). In the fuel switching state Mc, combustion of the liquid fuel Fo and the gas fuel Fg easily becomes unstable. Thus, in this mid-switch water purging step (S2), water W of the second flow rate w2, which is lower than the first flow rate w1 in the liquid fuel supply state Mo and the third flow rate w3 in the cleaning step (S5), is supplied to the liquid-fuel channels 56 of the main nozzles 53.

Thus, in the present embodiment, the combustion stability of the liquid fuel Fo and the gas fuel Fg in the fuel switching state Mc can be secured, and at the same time, the coking in the fuel switching state Mc can be inhibited.

Further, in the present embodiment, since the water W is supplied to the liquid-fuel channels 56 of the main nozzles 53 even in the fuel switching state Mc, at the timing (t4) at which the gas fuel supply state Mg is reached, the liquid fuel Fom inside the main liquid-fuel branch lines 259 and the liquid-fuel channels 56 of the main nozzles 53 has been already replaced with the water W to some extent. Thus, in the present embodiment, the water replacement step (S4), which is performed after a post-gas fuel supply state Mg is reached, can be completed within a short period of time.

Note that in the present embodiment, although both the flow rate of the water W supplied in the mid-switch water purging step (S2) and the flow rate of the water supplied in the replacement step (S4) are the second flow rate w2, those flow rates do not need to be the same flow rate. However, by using the same flow rate for the flow rate of the water W supplied in the mid-switch water purging step (S2) and for the flow rate of the water supplied in the replacement step (S4), control of the water adjustment valve 213 can be simplified.

While the water replacement step (S4) is performed on the main nozzles 53, the flow rate of the liquid fuel Fom sprayed into the tubes 61 from the main nozzles 53 is relatively high. If the liquid fuel Fop is also sprayed from the pilot nozzles 43 during this water replacement step (S4), the flow rate of the liquid fuel Fo sprayed into the tube 61 becomes extremely high, and this causes an increase of the combustion amount and a deterioration of the combustion stability. Thus, in the present embodiment, the first air purging step (S11) for the pilot nozzles 43 is started at the same timing as the timing at which the state of the pilot nozzles 43 is switched from the liquid fuel supply state Po to the gas fuel supply state Pg and at which the water replacement step (S4) for the main nozzles 53 is completed.

If the air A having a high pressure is supplied to the liquid-fuel channels 46 of the pilot nozzles 43 from the start of the first air purging step (S11), the liquid fuel Fop accumulated inside the pilot liquid-fuel branch lines 258 and the liquid fuel channels 46 of the pilot nozzles 43 sprays out from the pilot nozzles 43 in a large quantity. Thus, in the present embodiment, for the predetermined period of time until the amount of the air A that can replace the liquid fuel Fop accumulated inside the pilot liquid-fuel branch lines 258 and the liquid-fuel channels 46 of the pilot nozzles 43 is completely supplied, the air A of the third pressure a3, which is a low pressure, is supplied to the liquid-fuel channels 46 of the pilot nozzles 43 (S12: the low-pressure purging step). After that, in order to cause a small amount of the liquid fuel Fop remaining inside the liquid-fuel channels 46 of the pilot nozzles 43 to be sprayed into the tubes 61, the air A of the fourth pressure a4, which is a high pressure, is supplied to the liquid-fuel channels 46 of the pilot nozzles 43 (S13: the high-pressure purging step).

In the present embodiment, the above-described second air purging steps (S14, S15) is performed after this first air purging step (S11) is completed. The pilot nozzles 43 cause the sprayed gas fuel Fgp to burn as a result of diffusion combustion. Thus, the diffusion flame is formed near the tip of the pilot nozzle 43. In this state in which the diffusion flame is formed near the tip of the pilot nozzle 43, the flame may flow backward into the liquid-fuel channel 46. Thus, in the present embodiment, in order to inhibit the flame from flowing backward, the air A having a low pressure is supplied to the liquid-fuel channels 46 in the second air purging steps (S14, S15). However, in the present embodiment, while the air purging step (S7) is being performed on the main nozzles 53, the second air purging steps (S14, S15) are not performed on the pilot nozzles 43. This is because the air supply source 231 of the present embodiment is not provided with a sufficient capability to perform both the air purging step (S7) for the main nozzles 53 and the second air purging steps (S14, S15) for the pilot nozzles 43 at the same time. In other words, as in the present embodiment, by differentiating timings at which the air supply source 231 is used for the pilot nozzles 43 and for the main nozzles 53, the air supply source 231 provided with a minimum capability can be used efficiently. On the other hand, when the air supply source 231 has sufficient capability, the second air purging steps (S14, S15) may be performed on the pilot nozzles 43 while the air purging step (S7) is being performed on the main nozzles 53. Further, the second air purging step at S14 and the second air purging step at S15 may be performed continuously.

As described above, in the present embodiment, before the post-switch water purging step (S3) for the main nozzles 53 is completed, in other words, while the post-switch water purging step (S3) is being performed on the main nozzles 53, the first air purging step (S11) is performed on the pilot nozzles 43. As a result, in the present embodiment, the coking of the liquid fuel Fop inside the liquid-fuel channel 46 of the pilot nozzle 43 can be suppressed.

INDUSTRIAL APPLICABILITY

According to an aspect of the present invention, stable combustion of fuel can be secured in the course of switching liquid fuel to gas fuel, and also coking of the liquid fuel can be suppressed.

REFERENCE SIGNS LIST

10 Gas turbine
11 Gas turbine rotor
15 Gas turbine casing
20 Compressor
21 Compressor rotor
25 Compressor casing
30 Turbine
31 Turbine rotor
35 Turbine casing
40 Combustor
41 Fuel injector
42 Pilot burner
43 Pilot nozzle (second nozzle)
44 Gas-fuel channel
46 Liquid-fuel channel
52 Main burner
53 Main nozzle (first nozzle or simply nozzle)
54 Gas-fuel channel
56 Liquid-fuel channel
61 Tube
100 Control device
101 Gas-fuel control unit
102 Liquid-fuel control unit
105 Fuel supply state recognition unit
106 Water purging control unit
107 Air purging control unit
210 Water purging device
211 Water supply source
212 Water main line
213 Water adjustment valve
230 Air purging device
231 Air supply source
232 Air main line
237 Air main valve
233 Pilot air line
234 Main air line
238 Pilot air adjustment valve
239 Main air adjustment valve
250 Liquid-fuel supply device
251 Liquid-fuel supply source
252 Liquid-fuel main line
253 Pilot liquid-fuel line
254 Main liquid-fuel
262 Liquid-fuel main valve
263 Pilot liquid-fuel valve
264 Main liquid-fuel valve
270 Gas-fuel supply device
271 Gas-fuel supply source
272 Gas-fuel main line
273 Pilot gas-fuel line
274 Main gas-fuel line
283 Pilot gas-fuel valve
284 Main gas-fuel valve

The invention claimed is:

1. A method for purging at least one fuel channel in a combustor having a nozzle that selectively sprays a liquid fuel and a gas fuel, the nozzle having formed therein a first liquid-fuel channel of the at least one fuel channel, through which the liquid fuel flows and which is open at a first tip portion of the nozzle, and a first gas-fuel channel of the at least one fuel channel, through which the gas fuel flows and which is open at the first tip portion of the nozzle, the method for purging the fuel channel comprising:

a water supplying step of supplying water to the first liquid-fuel channel in a first liquid fuel supply state in which, of the liquid fuel and the gas fuel, only the liquid fuel is supplied to the nozzle;

a mid-switch water purging step of supplying the water to the first liquid-fuel channel during a fuel switching state, during which, from the first liquid fuel supply state, the liquid fuel being supplied to the first liquid-fuel channel of the nozzle decreases while the gas fuel starts to be supplied to the first gas-fuel channel of the nozzle, and the gas fuel supplied to the first gas-fuel channel increases; and a post-switch water purging step of supplying the water to the first liquid-fuel channel after the fuel switching state has ended as a result of the liquid fuel no longer being supplied to the first liquid-fuel channel, and only the gas fuel, of the liquid fuel and the gas fuel, starts being supplied to the nozzle, wherein in the mid-switch water purging step, the water of a second flow rate value is supplied to the first liquid-fuel channel, the second flow rate value being lower than a first flow rate value that is a flow rate of the water supplied to the first liquid-fuel channel in the water supplying step, and in the post-switch water purging step, the water of a third flow rate value is at least temporarily supplied to the first liquid-fuel channel, the third flow rate value being higher than the second flow rate value.

2. The method for purging the at least one fuel channel according to claim 1,
wherein the third flow rate value is lower than the first flow rate value.

3. The method for purging the at least one fuel channel according to claim 1, wherein
the post-switch water purging step includes a water replacement step of supplying the water of the second flow rate value to the first liquid-fuel channel continuously from the mid-switch water purging step, and
a cleaning step of supplying the water of the third flow rate value to the first liquid-fuel channel after the water replacement step.

4. The method for purging the at least one fuel channel according to claim 3, wherein
the post-switch water purging step includes an intermittent purging step of intermittently supplying the water to the first liquid-fuel channel after the cleaning step, and
the water of the third flow rate value is supplied to the first liquid-fuel channel in the intermittent purging step.

5. The method for purging the at least one fuel channel according to claim 1, wherein
in the water supplying step, the first low rate value of the water supplied to the first liquid-fuel channel is caused to gradually become lower before the fuel switching state is reached, such that the flow rate of the water supplied to the first liquid-fuel channel becomes the second flow rate value at a timing at which the fuel switching state is reached.

6. The method for purging the at least one fuel channel according to claim 1, wherein
an air purging step is performed in which air is supplied to the first liquid-fuel channel after the post-switch water purging step is completed, and
the air purging step includes a low-pressure purging step of supplying the air of a first pressure to the first liquid-fuel channel, and a high-pressure purging step of supplying the air of a second pressure to the first liquid-fuel channel after the low-pressure purging step, the second pressure being higher than the first pressure.

7. The method for purging the at least one fuel channel according to claim 1, wherein
the combustor includes a second nozzle as well as the nozzle that functions as a first nozzle, the second nozzle having formed therein a second liquid-fuel channel, through which the liquid fuel flows and which is open at a second tip portion of the second nozzle, and a second gas-fuel channel, through which the gas fuel flows and which is open at the second tip portion of the second nozzle, and an air purging step of supplying air to the second liquid-fuel channel of the second nozzle is performed at a timing at which, from a second liquid fuel supply state in which, of the liquid fuel and the gas fuel, only the liquid fuel is supplied to the second nozzle, the liquid fuel is no longer supplied to the second nozzle and only the gas fuel is being supplied to the second nozzle, and the post-switch water purging step for the first nozzle is being performed.

8. The method for purging the at least one fuel channel according to claim 3, wherein
the combustor includes a second nozzle as well as the nozzle that functions as a first nozzle, the second nozzle having formed therein a second liquid-fuel channel of the at least one fuel channel, through which the liquid fuel flows and which is open at a second tip portion of the second nozzle, and a second gas-fuel channel of the at least one fuel channel, through which the gas fuel flows and which is open at the second tip portion of the second nozzle,
an air purging step of supplying air to the second liquid-fuel channel of the second nozzle is performed at a timing at which, from a second liquid fuel supply state in which, of the liquid fuel and the gas fuel, only the liquid fuel is supplied to the second nozzle, the liquid fuel is no longer supplied to the second nozzle and only the gas fuel is being supplied to the second nozzle, and the post-switch water purging step for the first nozzle is being performed, and
the air purging step for the second nozzle is started at the timing at which the cleaning step for the first nozzle is started.

9. The method for purging the at least one fuel channel according to claim 7, wherein
the air purging step for the second nozzle includes a low-pressure purging step of supplying the air of a third pressure to the second liquid-fuel channel of the second nozzle, and a high-pressure purging step of supplying the air of a fourth pressure to the second liquid-fuel channel of the second nozzle after the low-pressure purging step for the second nozzle, the fourth pressure being higher than the third pressure.

10. The method for purging the at least one fuel channel according to claim 7, wherein
the second nozzle burns the liquid fuel or the gas fuel sprayed from the second nozzle by diffusion combustion, and
after a first air purging step, which is the air purging step for the second nozzle, a second air purging step is performed, in which the air having a second pressure lower than a first pressure of the air supplied to the second liquid-fuel channel of the second nozzle in the first air purging step is supplied to the second liquid-fuel channel of the second nozzle.

11. A purging device for at least one fuel channel in a combustor having a nozzle that selectively sprays a liquid fuel and a gas fuel, the nozzle having formed therein a first liquid-fuel channel of the at least one fuel channel, through which the liquid fuel flows and which is open at a first tip portion of the nozzle, and a first gas-fuel channel of the at least one fuel channel, through which the gas fuel flows and which is open at the first tip portion of the nozzle, the purging device comprising:
- a water line that supplies water to the first liquid-fuel channel;
- a water adjustment valve that adjusts a flow rate of the water flowing through the water line; and
- a controller that controls an opening amount of the water adjustment valve,
- the controller including a fuel supply state recognition controller that recognizes a fuel supply state to the nozzle and a water purging controller that controls the opening amount of the water adjustment valve in accordance with the fuel supply state recognized by the fuel supply state recognition controller,
- the fuel supply state recognition controller recognizing a liquid fuel supply state in which, of the liquid fuel and the gas fuel, only the liquid fuel is supplied to the nozzle, a first gas fuel supply state in which, of the liquid fuel and the gas fuel, only the gas fuel is supplied to the nozzle, and a fuel switching state that is a state of transition from the liquid fuel supply state to the first gas fuel supply state,
- the water purging controller instructing a pre-switch opening amount to the water adjustment valve, which causes the water of a first flow rate value to be supplied to the first liquid-fuel channel, when the fuel supply state recognition controller recognizes that the liquid fuel supply state exists, instructing a mid-switch opening amount to the water adjustment valve, which causes the water of a second flow rate value to be supplied to the first liquid-fuel channel, when the fuel supply state recognition controller recognizes that the fuel switching state exists, and instructing a post-switch opening amount to the water adjustment valve, which causes the water to be supplied to the first liquid-fuel channel, when the fuel supply state recognition controller recognizes that the first gas fuel supply state has been reached, and
- the water purging controller causing the mid-switch opening amount to be smaller than the pre-switch opening amount so as to cause the second flow rate value to be lower than the first flow rate value, and determining the post-switch opening amount such that the water of a third flow rate value, which is higher than the second flow rate value, is at least temporarily supplied to the first liquid-fuel channel in the first gas fuel supply state.

12. The purging device for the at least one fuel channel according to claim 11, wherein
the water purging controller determines the post-switch opening amount such that the third flow rate value becomes lower than the first flow rate value.

13. The purging device for the at least one fuel channel according to claim 11, wherein
when the fuel supply state recognition controller recognizes that the first gas fuel supply state has been reached, as the post-switch opening amount, the water purging controller instructs, to the water adjustment valve, a water replacement opening amount, which is equal to the mid-switch opening amount, such that the water of the second flow rate value is supplied to the first liquid-fuel channel continuously from the fuel switching state, and
after instructing the water replacement opening amount to the water adjustment valve, the water purging controller instructs a cleaning opening amount to the water adjustment valve as the post-switch opening amount, such that the water of the third flow rate value is supplied to the first liquid-fuel channel.

14. The purging device for the at least one fuel channel according to claim 13, wherein
after instructing the cleaning opening amount to the water adjustment valve, as the post-switch opening amount, the water purging controller instructs, to the water adjustment valve, an intermittent purging opening amount, which causes the water of the third flow rate value to be intermittently supplied to the first liquid-fuel channel.

15. The purging device for the fuel channel according to claim 11, wherein
the fuel supply state recognition controller recognizes in advance a first timing at which the liquid fuel supply state is switched to the fuel switching state, and
when the fuel supply state recognition controller recognizes the first timing in advance, the water purging controller instructs the pre-switch opening amount to the water adjustment valve, which causes the flow rate of the water supplied to the first liquid-fuel channel to gradually become lower, such that the first flow rate value of the water supplied to the first liquid-fuel channel becomes the second flow rate value at a second timing at which the fuel switching state is reached.

16. The purging device for the at least one fuel channel according to claim 11, further comprising:
an air line that supplies air to the first liquid-fuel channel; and
an air adjustment valve that adjusts a first air line pressure of the air flowing through the air line, wherein
the controller includes an air purging controller that controls an opening amount of the air adjustment valve,
the water purging controller instructs the water adjustment valve to close after instructing the post-switch opening amount to the water adjustment valve, and
when the first gas fuel supply state exists and the water adjustment valve is in a closed state, the air purging controller instructs, to the air adjustment valve, a first nozzle air purging opening amount, which causes the air to be supplied to the first liquid-fuel channel.

17. The purging device for the at least one fuel channel according to claim 16, wherein
the air purging controller instructs, to the air adjustment valve, a low-pressure purging opening amount as the first nozzle air purging opening amount, which causes the air of a first pressure value to be supplied to the first liquid-fuel channel, and
after instructing the low-pressure purging opening amount, the air purging controller instructs a high-pressure purging opening amount as the first nozzle air purging opening amount, which causes the air of a second pressure value to be supplied to the first liquid-fuel channel, the second pressure value being higher than the first pressure value.

18. The purging device for the at least one fuel channel according to claim 16, wherein
the combustor includes a second nozzle as well as the nozzle that functions as a first nozzle, the second nozzle having formed therein a second liquid-fuel channel of the at least one fuel channel, through which the liquid fuel flows and which is open at a second tip portion of the second nozzle, and a second gas-fuel channel of the at least one fuel channel, through which the gas fuel flows and which is open at the second tip portion of the second nozzle, the purging device further includes a second air line, which supplies the air to the second liquid-fuel channel of the second nozzle, as well as a first air line, which is the air line that supplies the air to the first liquid-fuel channel of the first nozzle, and a second air adjustment valve that adjusts a second air line pressure of the air flowing through the second air line, the fuel supply state recognition controller recognizes a second gas fuel supply state in which, of the liquid fuel and the gas fuel, only the gas fuel is supplied to the second nozzle, and when both the first nozzle and the second nozzle are in the first and second gas fuel supply state, respectively and while the water purging controller is instructing the post-switch opening amount, the air purging controller instructs, to the second air adjustment valve, a second nozzle first air purging opening amount, which causes the air to be supplied to the second liquid-fuel channel of the second nozzle.

19. The purging device for the at least one fuel channel according to claim 18, wherein the second nozzle burns the liquid fuel or the gas fuel sprayed from the second nozzle by diffusion combustion, the air purging controller instructs, to the second air adjustment valve, the second nozzle first air purging opening amount including a high pressure purging opening amount and a low pressure purging opening amount, and the low-pressure purging opening amount is the second nozzle first air purging opening amount of the second air adjustment valve, which causes the air of a third pressure value to be supplied to the second liquid-fuel channel of the second nozzle, after instructing the low-pressure purging opening amount to the second air adjustment valve, the air purging controller instructs, to the second air adjustment valve, the high-pressure purging opening amount as the second nozzle first air purging opening amount of the second air adjustment valve, which causes the air of a fourth pressure value to be supplied to the second liquid-fuel channel of the second nozzle, the fourth pressure value being higher than the third pressure value, and after instructing the second nozzle first air purging opening amount to the second air adjustment valve, the air purging controller instructs a second nozzle second air purging opening amount, which causes the air of a fifth pressure value that is lower than the third and fourth pressure of the air supplied to the second liquid-fuel channel of the second nozzle using the second nozzle first air purging opening amount to be supplied to the second liquid-fuel channel of the second nozzle.

20. A gas turbine plant, comprising:

a purging device for at least one fuel channel in a combustor having a nozzle that selectively sprays a liquid fuel and a gas fuel, the nozzle having formed therein a first liquid-fuel channel of the at least one fuel channel, through which the liquid fuel flows and which is open at a first tip portion of the nozzle, and a first gas-fuel channel of the at least one fuel channel, through which the gas fuel flows and which is open at the first tip portion of the nozzle, the purging device comprising:

a water line that supplies water to the first liquid-fuel channel;

a water adjustment valve that adjusts a flow rate of the water flowing through the water line; and a controller that controls an opening amount of the water adjustment valve, the controller including a fuel supply state recognition controller that recognizes a fuel supply state to the nozzle and a water purging controller that controls the opening amount of the water adjustment valve in accordance with the fuel supply state recognized by the fuel supply state recognition controller, the fuel supply state recognition controller recognizing a liquid fuel supply state in which, of the liquid fuel and the gas fuel, only the liquid fuel is supplied to the nozzle, a first gas fuel supply state in which, of the liquid fuel and the gas fuel, only the gas fuel is supplied to the nozzle, and a fuel switching state that is a state of transition from the liquid fuel supply state to the first gas fuel supply state, the water purging controller instructing a pre-switch opening amount to the water adjustment valve, which causes the water of a first flow rate value to be supplied to the first liquid-fuel channel, when the fuel supply state recognition controller recognizes that the liquid fuel supply state exists, instructing a mid-switch opening amount to the water adjustment valve, which causes the water of a second flow rate value to be supplied to the first liquid-fuel channel, when the fuel supply state recognition controller recognizes that the fuel switching state exists, and instructing a post-switch opening amount to the water adjustment valve, which causes the water to be supplied to the first liquid-fuel channel, when the fuel supply state recognition controller recognizes that the first gas fuel supply state has been reached, and the water purging controller causing the mid-switch opening amount to be smaller than the pre-switch opening amount so as to cause the second flow rate value to be lower than the first flow rate value, and determining the post-switch opening amount such that the water of a third flow rate value, which is higher than the second flow rate value, is at least temporarily supplied to the first liquid-fuel channel in the first gas fuel supply state;

the combustor; and a turbine that is driven by combustion gas generated by the combustor.

* * * * *